J. STANISLAV.
WHEEL FOR VEHICLES.
APPLICATION FILED JUNE 16, 1919.
1,317,331.
Patented Sept. 30, 1919.
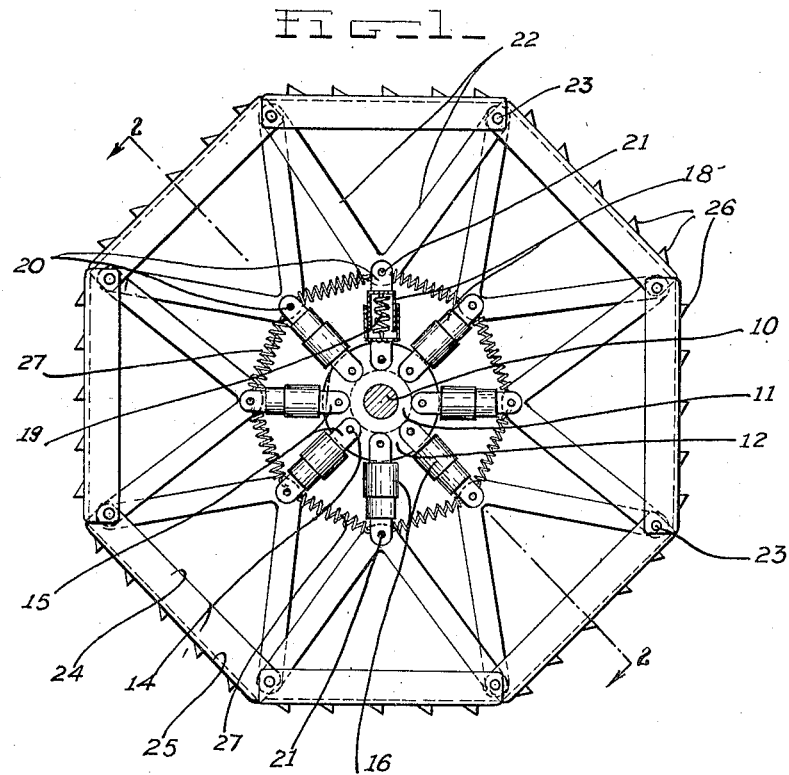
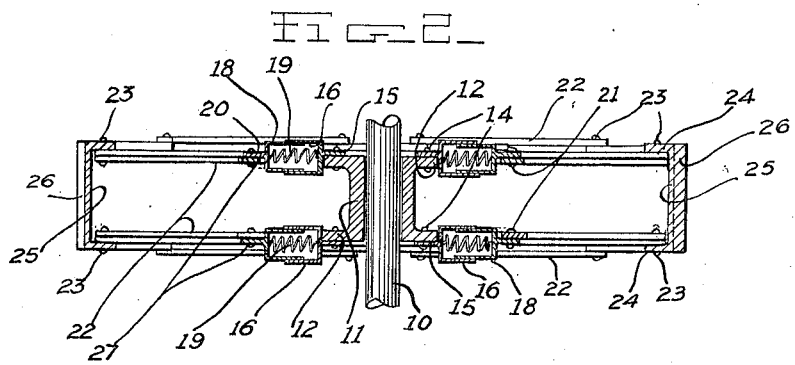
INVENTOR
John Stanislav
BY
ATTORNEY

UNITED STATES PATENT OFFICE.

JOHN STANISLAV, OF WILPEN, PENNSYLVANIA.

WHEEL FOR VEHICLES.

1,317,331.　　　　　Specification of Letters Patent.　　Patented Sept. 30, 1919.

Application filed June 16, 1919. Serial No. 304,414.

*To all whom it may concern:*

Be it known that I, JOHN STANISLAV, a citizen of Czecho-Slovakia, residing at Wilpen, county of Westmoreland, and State of Pennsylvania, have invented certain new and useful Improvements in Wheels for Vehicles, of which the following is a specification.

This invention relates to improvements in wheels such as are used as the driving wheels for vehicles.

The principal object of the invention is to provide a wheel having flexible joint elements, and a tread of the caterpillar type.

A further object is to provide a wheel having unusual gripping properties so that slipping or skidding is prevented, and Finally to provide a wheel comprised of few and simple parts, which is easily constructed and effective in use.

These and other like objects are attained by the novel construction and combination of parts hereinafter described, and shown in the accompanying drawings, forming a material part of this disclosure, and in which:—

Figure 1 is a side elevational view showing a wheel made in accordance with the invention, and Fig. 2 is a transverse sectional view taken on line 2—2 of Fig. 1.

Referring to the drawings, the numeral 10 indicates a shaft which may be either keyed or otherwise secured to a sleeve 11, having flanges 12, at both ends.

Pivotally secured, by pins 14, to each of the flanges are a plurality of flat lugs 15, extending from the inner or base ends of cylinders 16, which normally radiate from the axis of the hub and of which any number may be used, eight being indicated in the construction.

Engaged within these radial cylinders are hollow telescopic elements 18 which are normally drawn into cylinders 16 by means of coiled tension springs 19 secured at their ends respectively in the bases of cylinders 16 and hollow elements 18.

Extending outwardly from the telescopic elements 18 are flat lugs 20 in which, fulcrumed on the pins 21, are bell-crank levers 22, their outer diverging ends being pivotally connected by pins 23, with those immediately adjacent the pins 23 also passing through the inturned flanges 24, of channel shaped flat plates 25, having a plurality of serrations or saw-like spurs 26, the same extending transversely across the outer side of the plate, and adapted to engage with the surface over which the wheel is passed.

Also connected between the pivotal pins 21, at the ends of the telescopic elements 18, are stiff helical tension springs 27 tending to hold the radially disposed telescopic elements in proper spaced relation, together with the fulcrumed ends of the bell-crank levers 22, but which obviously may give under stress, permitting the channel elements to assume positions in operation whereby the wheel rotates in a relatively smooth manner as compared with wheels having a circular periphery, while it will be evident, due to the cross spurs secured upon the exterior of the elongated channel plates that the tractive effect is greatly enhanced.

It is to be understood that the bell-crank elements 22 are made of resilient material so as to spring slightly when depressed, and that due to the interconnection of the tensional springs 27 maintain normally the positions shown in Fig. 1.

Having thus described my invention what I claim as new and desire to secure by Letters Patent, is:—

1. In a wheel, the combination with a tubular hub having flanged elements in each end, of a plurality of cylinders pivotally engaged in the flanges of said hub, telescopic elements slidably engaged in said cylinders, tensional springs arranged therebetween so as to draw said telescopic element inwardly, bell-crank levers fulcrumed in said telescopic elements and extending outward therefrom, all of said bell-crank levers being pivotally engaged at their diverging ends with adjacent levers, channel shaped plates engaged at the ends of said bell-crank levers, and a plurality of transverse spurs formed upon the exterior of said channel shaped plates.

2. In a vehicle wheel, the combination with a rigid tubular hub having annular flanges formed at each end, of cylinders having lugs, pivoted in each of said flanges, tubular elements telescopically received in said cylinders, springs interposed between the bases of said cylinders, and said telescopic elements whereby they are drawn together, lugs extending from said telescopic elements, tensional springs extending between the outer ends of said lugs, bell-crank levers fulcrumed at their angular converging ends in said lugs, pivotal connections between the ends of adjacent bell-crank levers, channel shaped plates pivoted to the connected ends of all of said levers, said plates presenting a flat outer surface, and a plurality of spur elements secured transversely of said plates.

In testimony whereof I have affixed my signature.

JOHN STANISLAV.

Copies of this patent may be obtained for five cents each, by addressing the "Commissioner of Patents, Washington, D. C."